(12) United States Patent
Bajaj (10) Patent No.: US 8,177,603 B2
(45) Date of Patent: May 15, 2012

(54) POLISHING PAD COMPOSITION

(75) Inventor: Rajeev Bajaj, Fremont, CA (US)

(73) Assignee: Semiquest, Inc., San Jose, CA (US)

(*) Notice: Subject to any disclaimer, the term of this patent is extended or adjusted under 35 U.S.C. 154(b) by 515 days.

(21) Appl. No.: 12/431,515

(22) Filed: Apr. 28, 2009

(65) Prior Publication Data

US 2009/0270019 A1 Oct. 29, 2009

Related U.S. Application Data (60) Provisional application No. 61/048,818, filed on Apr. 29, 2008, provisional application No. 61/111,290, filed on Nov. 4, 2008, provisional application No. 61/111,337, filed on Nov. 5, 2008.

(51) Int. Cl.
*B24B 1/00* (2006.01)

(52) U.S. Cl. .......... 451/41; 451/526; 451/527; 451/548; 451/550

(58) Field of Classification Search .......... 451/526, 451/527, 548, 550, 41; 428/304.4
See application file for complete search history.

(56) References Cited

U.S. PATENT DOCUMENTS

| | | | |
|---|---|---|---|
| 5,489,233 A | 2/1996 | Cook | |
| 5,578,362 A * | 11/1996 | Reinhardt et al. | 428/147 |
| 5,607,346 A | 3/1997 | Wilson et al. | |
| 5,609,517 A | 3/1997 | Lofaro | |
| 5,795,218 A | 8/1998 | Doan et al. | |
| 5,866,226 A * | 2/1999 | Masumura et al. | 428/64.1 |
| 5,976,000 A * | 11/1999 | Hudson | 451/534 |
| 6,062,968 A * | 5/2000 | Sevilla et al. | 451/526 |
| 6,089,965 A * | 7/2000 | Otawa et al. | 451/527 |
| 6,095,902 A | 8/2000 | Reinhardt | |
| 6,217,434 B1 | 4/2001 | Roberts | |
| 6,245,406 B1 * | 6/2001 | Kuramochi et al. | 428/64.1 |
| 6,354,915 B1 | 3/2002 | James et al. | |
| 6,390,890 B1 * | 5/2002 | Molnar | 451/41 |
| 6,579,799 B2 * | 6/2003 | Chopra et al. | 438/692 |
| 6,612,916 B2 | 9/2003 | Kollodge et al. | |
| 6,641,463 B1 * | 11/2003 | Molnar | 451/41 |
| 6,648,733 B2 | 11/2003 | Roberts | |
| 6,656,018 B1 * | 12/2003 | Hsu et al. | 451/41 |
| 6,685,540 B2 | 2/2004 | Cherian | |
| 6,726,540 B2 * | 4/2004 | Yano | 451/41 |
| 6,848,974 B2 * | 2/2005 | Hasegawa et al. | 451/41 |
| 6,890,244 B2 | 5/2005 | Hsu | |
| 6,896,593 B2 | 5/2005 | Prasad | |

(Continued)

OTHER PUBLICATIONS

Semiquest, Inc., PCT/US2009/041944 filed Apr. 28, 2009, International Search Report and Written Opinion, ISA/US, Jun. 22, 2009, 8pp.

(Continued)

*Primary Examiner* — George Nguyen
(74) *Attorney, Agent, or Firm* — SNR Denton US LLP (57) ABSTRACT

Polishing pads for use in chemical mechanical planarization (CMP) or polishing elements/surfaces of such pads are made from a combination of immiscible polymers, for example polyurethane and polyolefin. The polymers are selected on the basis of interfacial interaction, melt index and ratios of melt indices between the polymer phases—a matrix phase and a dispersed phase. By selecting the polymer system such that the two polymers are immiscible in one another and preferentially form separate domains, the dispersed phase can be removed when conditioning or polishing processes expose it. The melt index of individual polymers and the ratio of melt indices determines dispersability of a smaller phase into the matrix, hence the phase size.

14 Claims, 3 Drawing Sheets

U.S. PATENT DOCUMENTS

| | | | |
|---|---|---|---|
| 6,899,611 B2 | 5/2005 | Reinhardt | |
| 6,935,931 B2 * | 8/2005 | Prasad | 451/41 |
| 6,953,388 B2 * | 10/2005 | Shimagaki et al. | 451/41 |
| 6,960,120 B2 * | 11/2005 | Prasad | 451/41 |
| 6,962,524 B2 | 11/2005 | Butterfield et al. | |
| 6,986,705 B2 | 1/2006 | Preston et al. | |
| 6,992,123 B2 | 1/2006 | Shiho | |
| 7,059,946 B1 * | 6/2006 | Obeng et al. | 451/285 |
| 7,077,879 B2 | 7/2006 | Ogawa | |
| 7,278,911 B2 * | 10/2007 | Butterfield et al. | 451/526 |
| 7,371,160 B1 | 5/2008 | Cruz | |
| 7,435,165 B2 * | 10/2008 | Prasad | 451/526 |
| 7,438,636 B2 | 10/2008 | Kulp | |
| 7,922,783 B2 * | 4/2011 | Sakurai et al. | 51/298 |
| 2001/0019940 A1 * | 9/2001 | Agarwal et al. | 451/526 |
| 2001/0035354 A1 | 11/2001 | Ashjaee et al. | |
| 2003/0132120 A1 | 7/2003 | Emesh et al. | |
| 2003/0153245 A1 | 8/2003 | Talieh et al. | |
| 2004/0171339 A1 * | 9/2004 | Prasad | 451/526 |
| 2005/0276967 A1 | 12/2005 | Prasad | |
| 2006/0089093 A1 * | 4/2006 | Swisher et al. | 451/526 |
| 2006/0183412 A1 * | 8/2006 | Allison et al. | 451/526 |
| 2006/0254706 A1 * | 11/2006 | Swisher et al. | 156/253 |
| 2008/0102741 A1 * | 5/2008 | Shih et al. | 451/527 |
| 2008/0248734 A1 | 10/2008 | Bajaj | |

OTHER PUBLICATIONS

Bajaj, Rajeev; PCT/US05/35978 filed Oct. 5, 2005; International Preliminary Report on Patentability; WIPO; Jun. 7, 2007; 7pp.

Bajaj, Rajeev; PCT/US05/35979 filed Oct. 5, 2005; International Preliminary Report on Patentability; IPEA/US; Sep. 27, 2006; 7pp.

Bajaj, Rajeev; PCT/US05/35732 filed Oct. 5, 2005; International Preliminary Report on Patentability; WIPO; Jun. 7, 2007; 5pp.

Bajaj, Rajeev; PCT/US05/35660 filed Oct. 5, 2005; International Preliminary Report on Patentability; WIPO; Jul. 19, 2007; 6pp.

Bajaj, Rajeev; PCT/US05/35979 filed Oct. 5, 2005; International Search Report and Written Opinion; ISA/US; Feb. 24, 2006; 8pp.

Bajaj, Rajeev; PCT/US05/35732 filed Oct. 5, 2005; International Search Report and Written Opinion; ISA/US; Nov. 28, 2006; 6pp.

Bajaj, Rajeev; PCT/US05/35660 filed Oct. 5, 2005; International Search Report and Written Opinion; ISA/US; Jun. 15, 2007; 8pp.

Bajaj, Rajeev; PCT/US05/35978 filed Oct. 5, 2005; International Search Report and Written Opinion; ISA/US; Mar. 15, 2006; 9pp.

Semiquest, Inc.; PCT/US2008/074658 filed Aug. 28, 2008; International Preliminary Report on Patentability; IPEA/US; mailed Aug. 3, 2010; 9 pp.

Gaggione Sas, Polyolefin (PE and PP), Information from Matiere Plastique Nathan, Sep. 2007; 1 page.

* cited by examiner

POLISHING PAD COMPOSITION

RELATED APPLICATIONS

This application relates to and is a Non-Provisional of U.S. Provisional Patent Applications 61/048,818, filed Apr. 29, 2008, 61/111,290, filed Nov. 4, 2008, and 61/111,337, filed Nov. 5, 2008, which applications are assigned to the assignee of the present invention and incorporated herein by reference in their entireties.

FIELD OF THE INVENTION

The present invention relates to the field of chemical mechanical planarization (CMP) and relates specifically to polishing pads for use in CMP and made of immiscible polymers.

BACKGROUND OF THE INVENTION

In modern integrated circuit (IC) fabrication, layers of material are applied to embedded structures previously formed on semiconductor wafers. Chemical Mechanical Planarization (CMP) is an abrasive process used to remove these layers (or portions thereof) and polish the resulting surface to achieve a desired structure. CMP may be performed on both oxides and metals and generally involves the use of chemical slurries applied in conjunction with a polishing pad in motion relative to the wafer (e.g., the pad rotates relative to the wafer with the slurry dispersed therebetween). The resulting smooth flat surface is necessary to maintain photolithographic depth of focus for subsequent wafer processing steps and to ensure that the metal interconnects are not deformed over contour steps. Damascene processing requires metal, such as tungsten or copper, to be removed from the top surface of a dielectric to define interconnect structures, using CMP.

Conventional polishing pads are made of polymers, typically urethane, either in cast form and filled with microporous elements or from non-woven felt coated with polyurethanes. During polishing operations, the polishing pad is rotated while contacting the wafer, which is also rotating, thus effecting polishing. Many pads have structures to provide for distributing slurry under the wafer during these polishing processes. Such slurry distribution structures include voids or micro-pores that are included by adding hollow micro-elements as described in U.S. Pat. No. 5,578,362 or through the introduction of bubbles formed during a casting process. U.S. Pat. No. 6,896,593 describes the use of supercritical $CO_2$ to form pores during molding processes.

During polishing, the polishing pad material undergoes plastic deformation that leads to deterioration of the pad's polishing ability. For example, such deformation during a polishing process results in that process becoming non-uniform and, as a result, the polishing operation can be accomplished only at a much lower removal rate.

In order to restore polishing performance and achieve consistent polishing performance, the polishing pad surface is periodically abraded (or conditioned) with a disk covered with fine grit diamond particles. The purpose of such conditioning is to remove the worn top layer of the pad and restore the texture of the top surface so as to effect consistent polishing. Such conditioning processes are well accepted for polishing processes employing hard pads. In the case of soft pads, however, conditioning processes are not as well accepted and, as such, tend to result in reduced useful lifetimes of such pads.

SUMMARY OF THE INVENTION

The composition of polishing pads for use in chemical mechanical planarization (CMP) as well as methods of their manufacture and use are herein provided. In one embodiment of the invention, a polishing pad or polishing element/surface of a pad is made from a combination of polyurethane and polyolefin, where polyurethane is the bulk phase and polyolefin is the dispersed phase. The bulk phase material (polyurethane) may have particles less than 100 nm in size, while the size of particles of the dispersed phase may be greater than 1000 nm. The dispersed phase polymer (e.g., polyolefin or a blend of two different polyethylene materials) is preferably immiscible within the bulk phase polymer (polyurethane) and is releasable from the polishing pad during polishing, thereby causing areas of microporosity on an exposed surface of the polishing pad. The polyolefin material may include a polyethylene material and/or a polypropylene material.

In some cases, the materials selected for the polyurethane-polyolefin polishing pad may be such that the ratio of the viscosity of the polyolefin to the viscosity of the polyurethane is less than 3. The tensile strength of the polyurethane material may be greater than 1000 pounds per square inch (psi), while the flexural modulus of the polyurethane material may be greater than 2000 psi, and the Shore D hardness of the polyurethane material may be greater than 25. In such a pad, the domain size of the dispersed polyolefin material may be 200 microns or less. In some embodiments, the polyolefin material in the polishing pad may be 1-35% by volume. Exposed surfaces of such a polishing pad may include surface features.

In yet another embodiment consistent with the present invention, a polishing pad may include particles of polyolefin that are dispersed in isocyanate or polyol prior to a polyurethane formation reaction. The polyolefin particles may be 10-200 microns in size. The polyurethane may have the following properties: a tensile strength greater than 1000 psi, a flexural modulus greater than 2000 psi, and a Shore D hardness greater than 25.

In a further embodiment consistent with the present invention, a polishing pad may include a polymer blend of a polyolefin material and a polyurethane material. The melt index of the polyolefin material may be less than or equal to 3 and the melt index of the polyurethane material may be greater than or equal to 15. Thus, the ratio of melt indices of the polyolefin material to the polyurethane material may be less than 0.2. The difference between the hardness of the polyolefin material and the polyurethane material may be less than 15 Shore D.

In still other embodiments of the invention, a polishing pad may include one or more polishing elements made from a polymer blend of two polyolefin materials in a polyurethane matrix. The melt index of the first polyolefin material may be less than or equal to 3, while the melt index of the second polyolefin material may be greater than or equal to 25 and the melt index of the polyurethane material greater than or equal to 15. More specifically, the ratio of melt indices of a first one of the polyolefin materials to the polyurethane material may be less than 0.2 while the ratio of melt indices of the second one of the polyolefin materials to the polyurethane material may be greater than 1. The difference between the hardness of the polyolefin materials and the polyurethane material may be less than 15 Shore D.

In yet a further embodiment of the invention, a polishing pad may include a polyurethane material with a melt index greater than 15 and a glass transition temperature (Tg) below room temperature, a first polyethylene material with a melt index of 25 or greater and a Tg below room temperature, and a second polyethylene material with a melt index of less than 3 and a Tg below room temperature. The difference between the hardness of the polyethylene materials and the polyurethane material may be less than 15 Shore D.

In yet another embodiment of the invention, a polishing pad may include a first polyethylene material with a melt index less than or equal to 3, a second polyethylene material with a melt index greater than or equal to 25, and a polyurethane material with a melt index greater than or equal to 15. The ratio of melt indices of the first polyethylene material to the polyurethane material may be less than 0.2, and the ratio of melt indices of the second polyethylene material to the polyurethane material may be greater than 1. The hardness of the polyurethane material may be Shore D 70 or less, while the hardness of the first polyethylene material may be Shore D 60 or less, and the hardness of the second polyethylene material may be Shore D 60 or less. The difference between the hardness of the polyurethane material, and the first polyethylene material and/or the second polyethylene material may be 15 Shore D or less.

In still another embodiment of the invention, a polishing pad may include a polyurethane material with a flexural modulus greater than 60 MPa and first and second polyethylene materials each with a flexural modulus greater than 200 MPa. The difference between the hardness of the polyurethane material, the first polyethylene material, and/or the second polyethylene material may be 15 Shore D or less.

Consistent with embodiments of the invention then, a polishing pad for use in CMP may be manufactured from two polymers that are immiscible in one another. The first polymer (e.g., a polyurethane material) may be a matrix phase and the second polymer (e.g., a polyolefin material) may be a dispersed phase. The dispersed phase may be formed of, for example, a low-density polyethylene, a low-density polyethylene-butene, and/or a very low-density polyethylene-butene and may be removable when it is exposed by a conditioning process and/or a polishing process. The domain size of the first polymer may be different from that of the second polymer. In some instances, the dispersed phase may be made up of two or more polyolefin materials, and in the case of a mixture of two polyolefin materials a first polyethylene material may have a melt index of 30 and a second polyethylene material may have a melt index of 0.75. Alternatively, or in addition, the domain size of the first polyolefin materials may be greater than 10 nm and the domain size of the second polyolefin material may be less than 10 nm During pad manufacture, the two polymers may be mixed together and the resulting mixture injected into a mold cavity to form the pad or polishing element. The relative domain sizes of the first and second polymers included in the polishing pad may be tuned by, for example, varying respective amounts of the first and second polymers included in the mixture.

Porosity may be introduced in a top polishing surface of polishing pads consistent with the present invention, for example due to wear experienced during a polishing process. Alternatively, or in addition, pore sites may be generated in the polishing pad during manufacture thereof, and the size of such pore sites may be modulated during said manufacture.

These and other embodiments of the invention are described in greater detail below.

BRIEF DESCRIPTION OF DRAWINGS

The present invention is illustrated by way of example, and not limitation, in the figures of the accompanying drawings, in which.

DETAILED DESCRIPTION

Disclosed herein is a polishing pad having a polishing surface/polishing elements made of immiscible polymers, for example polyurethane and polyolefin. In one example of such a pad, the bulk phase of the polishing surface/elements is made of polyurethane while the dispersed phase (which may be released during a polishing process) is made of polyolefin. As the dispersed phase material is released during the polishing process, areas of micro-porosity are formed on the polishing surface/elements of the pad.

Figure 1:
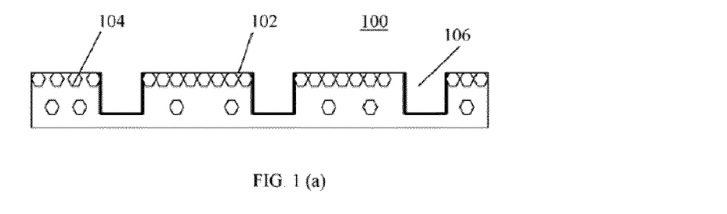
FIGS. 1(a) and 1(b) show cross-sections of different classes of polishing pads which, despite their differences, may be manufactured and used in accordance with embodiments of the present invention.

FIG. 1(a) is a profile cutaway view of a class of polishing pads, such as the IC 1000 pads of Rohm and Haas, which may be updated by being manufactured and used in accordance with the present invention. Polishing pad 100 contains microelements 102 embedded in a polymeric matrix 104, which may be polyurethane. The pad surface contains grooves 106 for slurry transport during polishing processes. Polishing pads of this variety provide multiple surface modifications to effect slurry distribution across the surface of the pad.

FIG. 1(b) shows a cross-section of a polishing pad 108 made by SemiQuest, Inc. This polishing pad 108 is an engineered structure and is described in U.S. patent application Ser. No. 11/697,622, filed 06-Apr.-2007, assigned to the assignee of the present invention and incorporated herein by reference. Pad 108 consists of polishing elements 110, which rest on a compressible under-foam 114 and are supported in vertical orientation by a guide plate 112. Polishing action is provided by the polishing elements, which are made of a solid polymer material, while slurry distribution is effected by the open spaces between the polishing elements. The open space is filled with open cell foam.

In accordance with embodiments of the present invention, the polishing surfaces 104 and 110 of these two different polishing pads may be made advantageously by using materials described herein.

Figure 2A:
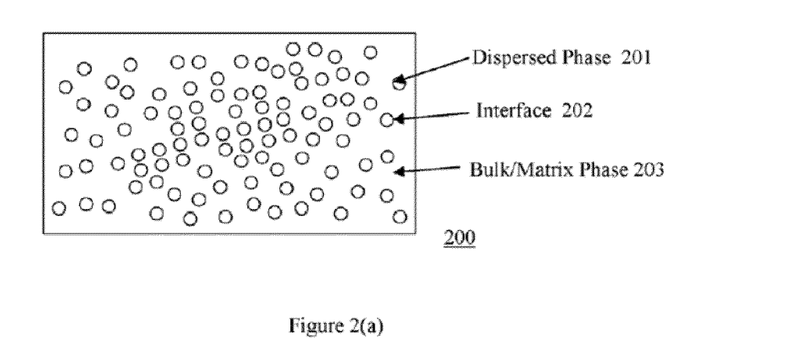
FIG. 2(a) shows a magnified view of a polishing pad or polishing element/surface made of a polyurethane-polyolefin blend in accordance with an embodiment of the present invention.
Figure 2B:
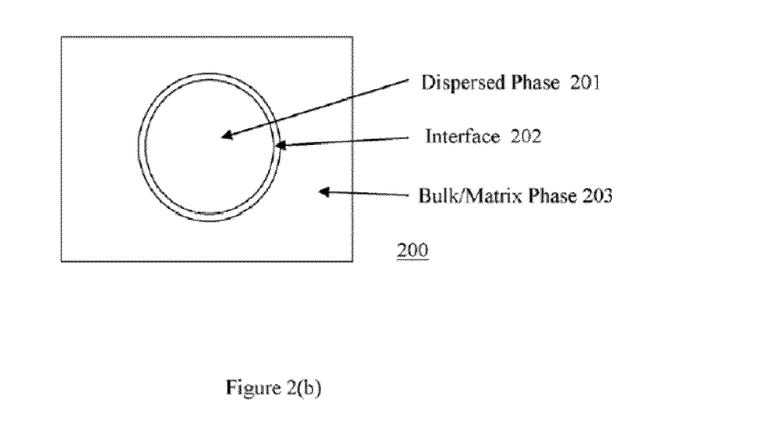
FIG. 2(b) shows a close up of a single dispersed phase particle in a matrix of a polishing pad or element, consistent with an embodiment of the present invention.

FIG. 2(a) shows a magnified view of a polishing pad or polishing element/surface 200 made of a polyurethane-polyolefin blend. In this case the dispersed phase 201, which may be polyolefin, is distributed in a matrix or bulk phase 203, which may be polyurethane. In a well mixed system, the size of the particles that make up the dispersed phase is on the order of 10-20 microns and the phase boundary 202 is distinct. FIG. 2(b) shows a close up of a single dispersed phase particle in the matrix. Due to large differences in polarity and interfacial tension, the interface is smooth and the two surfaces show no adhesion. Polyolefin particles are pulled back from the polyurethane interface.

In an embodiment of the present invention then, a polishing pad (which may be any of the above-described configurations) includes one or more polishing elements or surfaces made from a polymer blend of polyolefin and polyurethane, where (1) the ratio of the viscosity of the polyolefin to the viscosity of the polyurethane is less than 3,
(2) the tensile strength of the polyurethane is greater than 1000 pounds per square inch (psi);
(3) the flexural modulus of the polyurethane is greater than 2000 psi;
(4) the shore D hardness of the polyurethane is greater than 25; and/or
(5) the domain size of the dispersed polyolefin phase is 200 microns or less.

In some cases, the polyolefin content of the polishing pad may be 1-35% by volume. Also, in some instances, the polyolefin may be polyethylene or polypropylene. Surface features of various types may be formed on the top surface of the pad (e.g., during or after formation of the pad), for example by machining the top surface of the pad.

A further embodiment of the invention provides a polishing pad having one or more polishing elements or surfaces made by dispersing polyolefin particles in isocyanate or polyol prior to a urethane formation reaction. In such a pad, polyolefin particles may be 10-200 microns in size, the tensile strength of the polyurethane may be greater than 1000 psi; the flexural modulus of the polyurethane may be greater than 2000 psi; and/or the shore D hardness of the polyurethane may be greater than 25. In such a pad, the polyolefin may be polyethylene or polypropylene.

Still another embodiment of the invention provides a method of manufacturing a polishing pad such as those discussed above using injection molding, extrusion, reaction injection molding, or sintering. In these various instances, polyolefin particles may be dispersed in a urethane precursor mix prior to a urethane forming reaction; polyolefin and thermoplastic polyurethane may be melt-mixed and subsequently injected into a mold to form the pad; and/or polyolefin and thermoplastic urethane may be mixed in-line in an injection molding machine used for forming the pad.

Still a further embodiment of the invention provides a polishing pad having one or more polishing elements or surfaces made from a polymer blend of polyolefin and polyurethane where the melt index ratio of polyolefin to polyurethane is less than 0.2, the melt index of the polyolefin is less than or equal to 3, and the melt index of the polyurethane is greater than or equal to 15. In such instances, the polyolefin may be polyethylene or polypropylene and the hardness of both the polyolefin and the polyurethane materials may differ by less than 15 Shore D.

Yet another embodiment of the invention provides a polishing pad having one or more polishing elements or surfaces made from a polymer blend of two polyolefins and polyurethane where the melt index ratio of a first one of the polyolefin materials to the polyurethane is less than 0.2, and the melt index ratio of the second one of the polyolefin materials to the polyurethane is greater than 1, where the melt index of the first polyolefin material is less than or equal to 3, the melt index of the second polyolefin material is greater than or equal to 25, and the melt index of the polyurethane is greater than or equal to 15. Either, or both, of the polyolefin materials may be polyethylene or polypropylene. For example, in some cases, at least one of the polyolefin materials is polypropylene. The hardness of all polyolefin and polyurethane materials may differ by less than 15 Shore D.

Still a further embodiment of the present invention provides a method of making a solid polishing pad containing two distinct phase sizes, one less than 100 nm and another greater than 1000 nm, by mixing polyurethane having a melt index greater than 15 with a first polyethylene material having a melt index of 25 or greater and a second polyethylene material having a melt index less than 3, and subjecting the mixture to melt mixing in an injection molding machine or extruder before injection into a mold cavity. In some cases, the polyurethane may have a glass transition temperature (Tg) below room temperature. Likewise, the polyethylene may have a Tg below room temperature. In some cases, the hardness of the polyurethane and polyethylene may differ by less than 15 Shore D.

Another embodiment of the present invention provides a polishing pad having one or more polishing elements or surfaces made from a polymer blend of two polyethylenes and polyurethane where a ratio of melt indices of a first of the polyethylene materials to the polyurethane is less than 0.2 and a ratio of melt indices of a second of the polyethylene materials to the polyurethane is greater than 1, where the melt index of the first polyethylene material is less than or equal to 3, the melt index of the second polyethylene material is greater than or equal to 25, and the melt index of the polyurethane is greater than or equal to 15. The hardness of the polyurethane may be Shore D 75 or less. The hardness of the first polyethylene material may be Shore D 60 or less. The hardness of the second polyethylene material may be Shore D 60 or less. A range of hardness of all three materials (i.e., differences between the various hardness of the respective materials) may be 15 Shore D or less.

Another embodiment of the present invention provides a polishing pad having one or more polishing elements or surfaces made from a polymer blend of two polyethylenes and polyurethane where a ratio of melt indices of a first of the polyethylene materials to the polyurethane is less than 0.2 and a ratio of melt indices of the second polyethylene material to the polyurethane is greater than 1, where the melt index of the first polyethylene material is less than or equal to 3, the melt index of the second polyethylene material is greater than or equal to 25, and the melt index of the polyurethane is greater than or equal to 15. The flexural modulus of the polyurethane may be greater than 60 MPa. The flexural modulus of the first polyethylene material may be greater than 200 MPa. The flexural modulus of the second polyethylene material may be greater than 200 MPa. The range of hardness of all three materials (i.e., differences between the various hardness of the respective materials) may be 15 Shore D or less.

In various embodiments, the present invention provides a method of introducing in-situ porosity in a polishing pad; means for modulating sizes of pore sites generated during manufacturing; and a polishing pad microstructure. A method of creating such microstructure with much reduced or no conditioning requirements is also provided.

Others have described mixing polymers to modify mechanical properties of a polishing pad. For example, U.S. Pat. No. 7,438,636 discloses mixing a lower modulus polymer in a higher modulus polymer matrix to improve toughness properties of a polishing pad. U.S. Pat. No. 7,371,160 describes dispersing an elastic phase in the matrix to improve polishing performance. In these modifications it is important for the dispersed phase to stay incorporated into the matrix, and the added elastomeric polymer preferably contains some chemical functionality that will enable it to form linkages with a polymeric matrix, such as a polyurethane matrix.

U.S. Pat. Nos. 7,077,879, 6,992,123, and 6,899,611 describe adding water-soluble polymer into the matrix. As the top surface of the pad is exposed to an aqueous environment during the polishing process, the water-soluble polymer is dissolved and carried away, leaving a cavity and thereby generating pores "in-situ". Similarly, U.S. Pat. No. 6,890,244 discloses adding soluble fibers to generate channel shaped porosity. U.S. Pat. No. 6,685,540 describes polymer particles distributed in a matrix, wherein the distributed phase itself has a composite core-shell morphology. U.S. Pat. No. 6,648,733 discloses a polishing pad containing co-polymers specifically to introduce hard and soft domains that are available during polishing. U.S. Pat. Nos. 5,489,233, 5,578,362, 6,095,902, 6,217,434, and 6,896,593 describe various polishing pads and their methods of use.

From these references, one could devise two methods of incorporating alternate polymers into a pad matrix. In one, insoluble polymers are added to modify mechanical properties of a pad and participate in polishing while the soluble polymers dissolve into the polish medium and generate porosity. In the other, insoluble polymers that are used for the dispersed phase have carefully chosen properties, such as hardness, modulus and Tg, etc., that are distinctly different from those of the matrix polymer to achieve improved mechanical properties.

Herein, however, is disclosed a method of selecting polymers based on interfacial interaction, melt index and ratios of melt indices between the two polymer phases —the matrix and the dispersed phase. By selecting the polymer system such that the two polymers are immiscible in one another and preferentially form separate domains, the dispersed phase can be removed when conditioning or polishing processes expose it. The melt index of individual polymers and the ratio of melt indices determines dispersability of a smaller phase into the matrix, hence the phase size. Mixing of the two polymers may be carried out in an injection-molding machine just prior to injecting the melt into a mold cavity, or the two polymers may be mixed separately, for example in a twin-screw extruder to achieve complete mixing.

Polymer blends are a class of materials made by mixing polymers to achieve new properties. Polymer mixtures thus created may be miscible, partially miscible or immiscible. Embodiments of the present invention utilize immiscible polymers where the appropriate domain size is achieved by selecting the immiscible polymers with appropriate melt indices and ratios of melt indices.

During melt processing of a urethane-polyolefin mixture, it is anticipated that discrete droplets of the polyethylene phase are distributed within the urethane melt. The size of the droplets is a function of shear force imparted by the extrusion machine, actual melt viscosities, as well as the relative ratio of melt viscosities of the two phases.

For polymers, important parameters that determine the size of the dispersed phase are capillary number, Ca, and viscosity ratio, p ($=n_d/n_m$), where $n_d$ is the viscosity of the dispersed phase and $n_m$ is the viscosity of the matrix phase. It is quite common to use the melt index (MI) instead of viscosity as it more closely reflects processing conditions. The ASTM International D1238 test procedure standardizes measurement of melt index as the weight of polymer extruded in 10 minutes at a constant temperature (190° C.) through a tubular die of specified diameter (0.0825 in~2.2 mm) when a standard weight (2160 grams) is placed on a driving piston.

The capillary number Ca represents the relative effect of viscous forces versus surface tension acting across an interface and is given by:

$$Ca = Rn_m Y'/a$$

where R is a characteristic droplet size, nm is viscosity of the matrix, Y' is the deformation rate of the matrix and a is the interfacial tension. When Ca exceeds a critical value, droplets break up. For a given system, the higher the shear force, the higher the deformation rate of the matrix; consequently droplets break up into smaller size. System specific parameters such as interfacial tension, absolute melt index of constituents and the ratio of melt indices of the constituents, combined with shear rate of the mixing unit (such as an injection molding machine or extruder), influence the size distribution of the dispersed phase.

Porosity is an important aspect of polishing pad structure. In the absence of porosity, the polish rate is very low. For example, a non-porous pad used to polish a wafer with a silicon dioxide film, when pressed against the pad at 5 psi down force and 50 rpm pad speed, may show less than 200 Å/min removal rate. When a porous pad is used under the same conditions, the film removal rate may be greater than 1000 Å/min.

A non-porous pad is able to achieve high film removal rates, similar to that of a porous pad, when it is subjected to diamond disk conditioning. The conditioning disk creates micro-asperities, which enable polishing to occur at a high rate. Porous pads also undergo degradation in removal performance over time (and wafers are generally polished for a long time). This is believed to be due to plastic flow of the pad material, which causes polish asperities to dull and pores to smear, reducing their ability to contain and transport slurry. Conditioning the pad surface with fine diamond disk, removes the damaged layer on the top surface of pad, exposes a fresh surface and regenerates asperities. Diamond conditioning is therefore an important part of a stable polish process.

Besides providing the benefit of a stable polish process, diamond conditioning also introduces variability in the process as disk-to-disk variations, as well as changes in diamond effectiveness over the lifetime of the conditioning disk cause process drifts that require frequent process monitoring and corrective actions. There is also a risk of diamond loss, which might see diamond dust embedded in the pad, causing catastrophic wafer loss due to scratches. It is therefore desirable to minimize, or possibly eliminate, conditioning as a process requirement.

The present invention provides a polishing pad microstructure that requires minimal (if any) conditioning. As indicated above, the present pad consists of at least two distinct, dispersed domain sizes created by mixing polyurethane with two polyolefins having different melt indices. One of the domains has particles of 1 micron or less, and preferably less than 100 nm, and the other domain has particles of 5-20 microns, and preferably approximately 10 microns. The role of the nano-domains (e.g., the >100nm-sized domains) is to provide the present pad the ability to wear uniformly, while exposing fresh nano-textures as the surface degrades. The large-sized domains (e.g., the ~10 micron-sized domains), on the other hand, provide sites for larger porosity, which act as slurry reservoirs for polishing. The relative size of the domains is important as the nano-domains are preferably smaller, and at least of the same order as the pad wear rate, for consistent polishing results. For example at 0.5 microns of pad wear per minute of polishing, the size of the smaller domains should be no more than 0.5 microns and, preferably, in the range of 100nm-200nm. Slurry reservoir domains, on the other hand, need to be larger by 1-2 orders of magnitude to provide stable slurry flow during polishing.

As discussed above, when using a mixture of immiscible polymers, such as polyurethane and polyethylene, the size of the dispersed phase is determined by the melt index of both polymers as well as the ratio of their respective melt indices. For example, when using polyurethane with melt index of 20 and polyethylene with a melt index of 30, polyethylene domains of 100 nm-2 microns were obtained; whereas when polyethylene of melt index 0.75 was used, polyethylene domains of 5-15 microns were obtained. It is expected that by using a mixture of two polyethylenes with respective melt indices of 30 and 0.75, with polyurethane of melt index 20, both small and larger sized domains can be created. The ratio of small and larger sized domains can be tuned by varying the relative amount of the two polyethylenes.

Figure 3:
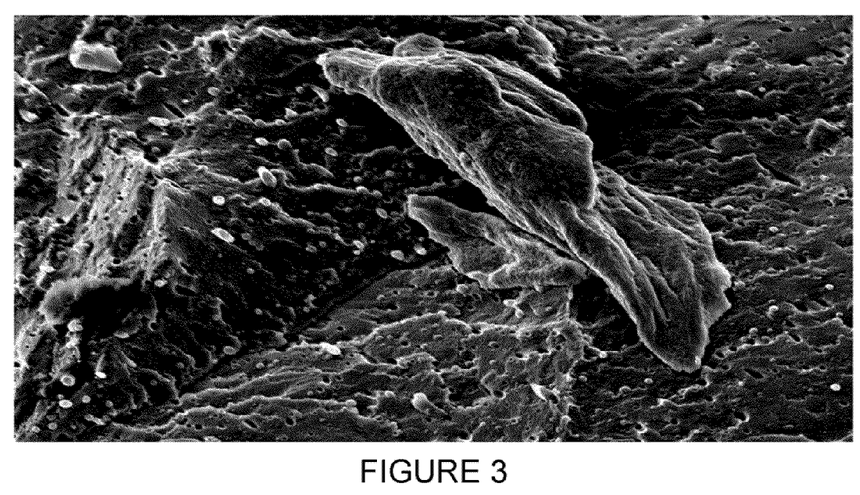
FIGS. 3-5 show inspection results for a part of a polishing pad/element made consistent with embodiments of the present invention and subsequently cross-sectioned and inspected with a scanning electron microscope (SEM).

In one embodiment of the invention, the matrix polymer may be Lubrizol Estane 58142 polyurethane (having a melt index of approximately 25) and the dispersed phase (making up approximately 10 percent by weight of the pad) may be 16MA400, a low-density polyethylene (having a melt index of approximately 30) available from Reliance Polymers India. These polymers were mixed in an injection molding machine to make polishing elements of 0.24" dia.×0.140" high with a 0.32" flange base, containing a cylindrical cavity on the underside, in a 60 cavity mold. Injection molding was carried out at 225° C. and well-mixed opaque parts were created. The parts were cross-sectioned and scanning electron microscope (SEM) inspection of the parts showed round-shaped dispersed phase particles of approximately 100 nm to 1 microns. Most cavities showed smooth walls, indicating the polyethylene particles did not adhere to the matrix. FIG. 3 shows these results.

In another embodiment of this invention, the matrix polymer is Lubrizol Estane 58144 polyurethane (with a melt index of approximately 20) and the dispersed phase (comprising approximately 10 percent by weight) is Dow DNDA 8335 NT 7, a low-density polyethylene-butene (with a melt index of approximately 30). These two materials were mixed in an injection molding machine to make polishing elements of 0.24" dia.×0.140" high with a 0.32" flange base, containing a cylindrical cavity on the underside, in a 16 cavity mold. Injection molding was carried out at 215° C. and well-mixed opaque parts were created. The parts were cross-sectioned and SEM inspection of the parts showed round shaped dispersed phase particles of approximately 100 nm to 2 microns. Smaller sized domains were also observed. Most cavities showed smooth walls, indicating the polyethylene particles did not adhere to the matrix.

Figure 4:
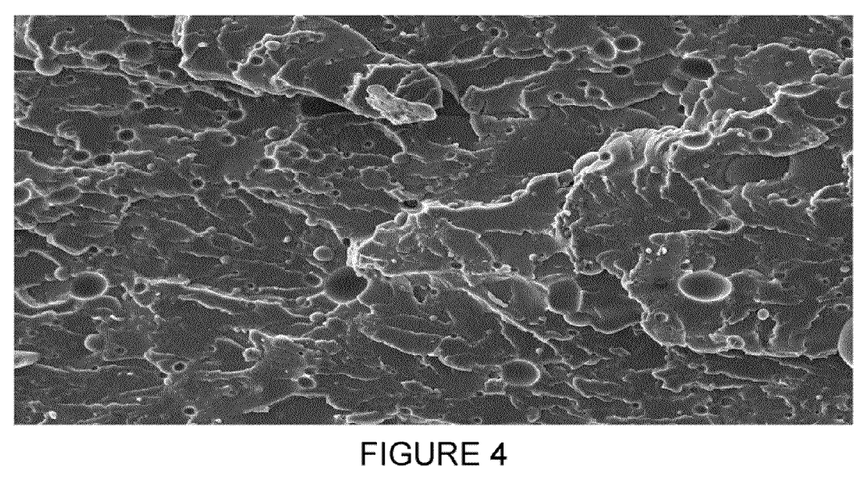
Figure 5:
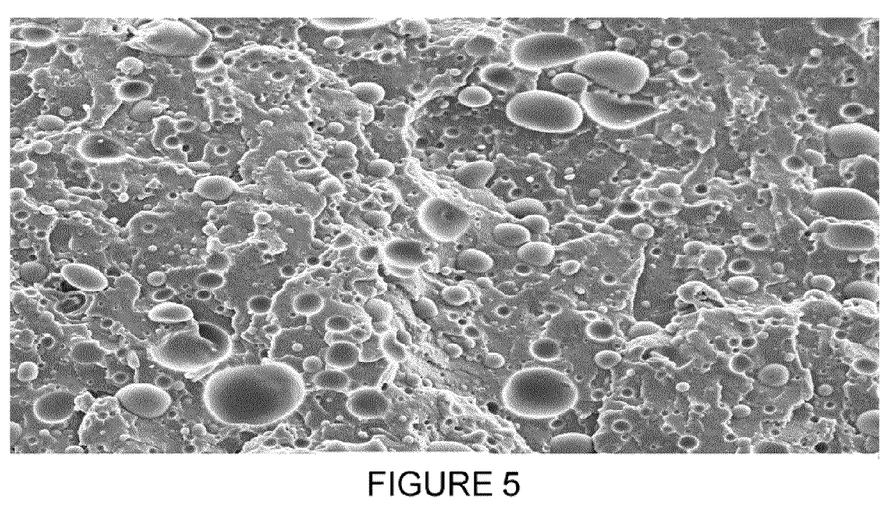

In still another embodiment of this invention, the matrix polymer is Lubrizol Estane 58144 polyurethane (with a melt index of approximately 20) and the dispersed phase (comprising approximately 10 percent by weight) is Dow Flexomer DFDB1085 NT, a very low-density polyethylene-butene (with a melt index of approximately 0.75). The two materials were mixed in an injection molding machine to make polishing elements of 0.24" dia.×0.1.40" high with a 0.32" flange base, containing a cylindrical cavity on the underside, in a 16 cavity mold. Injection molding was carried out at 215° C. and well-mixed opaque parts were created. The parts were cross sectioned and SEM inspection of the parts showed round shaped dispersed phase particles of approximately 5-15 microns. Smaller sized domains were also observed. Most cavities showed smooth walls, indicating the polyethylene particles did not adhere to the matrix. The concentration of the domains was small. FIGS. 4 and 5 show these results.

In still another embodiment of this invention, the matrix polymer is Lubrizol Estane 58144 polyurethane (with a melt index of approximately 20) and the dispersed phase (comprising approximately 20 percent by weight) is Dupont 2020, a polyethylene (with a melt index of approximately 1.1). The two materials were mixed in an injection molding machine to make polishing elements of 0.24" dia.×0.140" high with a 0.32" flange base, containing a cylindrical cavity on the underside, in a 32 cavity mold. Injection molding was carried out at 215° C. and well-mixed opaque parts were created. The parts were cross sectioned and SEM inspection of the parts showed round shaped dispersed phase particles of approximately range 5-15 microns. Most cavities showed smooth walls, indicating the polyethylene particles did not adhere to the matrix.

Thus, a polishing pad for use in CMP and made from a combination of polyurethane and polyolefin, where polyurethane is the bulk phase and polyolefin is the dispersed phase, has been described. Although discussed with reference to various examples, the present invention is not intended to be limited thereby and should only be measured in terms of the claims, which follow.

What is claimed is:

1. A polishing pad for use in chemical mechanical planarization (CMP), comprising:
   a first polymer, wherein the first polymer is a bulk phase; and
   a second polymer, wherein the second polymer is a dispersed phase, is immiscible within the first polymer and is releasable from the polishing pad during polishing, thereby causing areas of microporosity on an exposed surface of the polishing pad,
   wherein the first polymer is a polyurethane material and the second polymer is a polyolefin material wherein a surface of the first polymer exhibits no adhesion to a surface of the second polymer, and wherein particles of the second polymer are pulled back from an interface between the second polymer and the first polymer.

2. The polishing pad of claim 1, wherein the polyolefin material is at least one of a polyethylene material and a polypropylene material.

3. The polishing pad of claim 1, wherein the polyolefin material is made from a blend of a first polyethylene material and a second polyethylene material, the first and second polyethylene materials being different from one another.

4. The polishing pad of claim 1, wherein:
   a ratio of the viscosity of the polyolefin to a viscosity of the polyurethane is less than 33;
   a tensile strength of the polyurethane material is greater than 1000 pounds per square inch (psi);
   a flexural modulus of the polyurethane material is greater than 2000 psi;
   a Shore D hardness of the polyurethane material is greater than 25; and
   a domain size of the dispersed polyolefin phase is 200 microns or less.

5. The polishing pad of claim 1, wherein the polishing pad includes 1-35% by volume polyolefin material.

6. The polishing pad of claim 1, wherein the exposed surface of the polishing pad includes a surface feature.

7. The polishing pad of claim 1, wherein particles of the polyolefin material are dispersed in isocyanate or polyol prior to a polyurethane formation reaction.

8. The polishing pad of claim 7, wherein the polyolefin particles are 10-200 microns in size, the polyurethane tensile strength is greater than 1000 pounds per square inch (psi), the polyurethane flexural modulus is greater than 2000 psi, and the polyurethane Shore D hardness is greater than 25.

9. The polishing pad of claim 1, wherein the polishing pad includes a polymer blend of the polyolefin material and the polyurethane material having:
   a melt index of the polyolefin material less than or equal to 3;
   a melt index of the polyurethane material greater than or equal to 15;

a melt index ratio of the polyolefin material/polyurethane material less than 0.2; and a difference between a hardness of the polyolefin material and the polyurethane material less than 15 Shore D.

10. The polishing pad of claim 3, wherein the polishing pad includes one or more polishing elements made from a polymer blend of the first and second polyethylene materials having:

a melt index of the first polyethylene material less than or equal to 3;

a melt index of the second polyethylene material greater than or equal to 25;

a melt index of the polyurethane material greater than or equal to 15;

a melt index ratio of the first polyethylene material/polyurethane material less than 0.2;

a melt index ratio of the second polyethylene material/polyurethane material greater than 1; and a range of hardness of the group of materials consisting of the first and second polyethylene materials and the polyurethane material less than 15 Shore D.

11. The polishing pad of claim 1, wherein the dispersed phase comprises a first dispersed phase and a second dispersed phase, a size of the first dispersed phase is greater than 10 nm and a size of the second dispersed phase is less than 10 nm.

12. The polishing pad of claim 3, wherein:

the polyurethane material has a melt index greater than 15, and a glass transition temperature (Tg) below room temperature;

the first polyethylene material has a melt index of less than 3, and has a Tg below room temperature;

the second polyethylene material has a melt index of 25 or greater, and has a Tg below room temperature; and a range of hardness of the group of materials consisting of the first and second polyethylene materials and the polyurethane materials is less than 15 Shore D.

13. The polishing pad of claim 3, wherein:

a melt index of the first polyethylene material is less than or equal to 3;

a melt index of the second polyethylene material is greater than or equal to 25;

a melt index of the polyurethane material is greater than or equal to 15;

a melt index ratio of the first polyethylene material/polyurethane material is less than 0.2;

a melt index ratio of the second polyethylene material/polyurethane material is greater than 1;

a hardness of the polyurethane material is Shore D 70 or less;

a hardness of the first polyethylene material is Shore D 60 or less;

a hardness of the second polyethylene material is Shore D 60 or less; and a range of hardness of the group of materials consisting of the polyurethane material, the first polyethylene material, and the second polyethylene material is 15 Shore D or less.

14. The polishing pad of claim 3, wherein:

a flexural modulus of the polyurethane material is greater than 60 MPa;

a flexural modulus of the first and second polyethylene material is greater than 200 MPa; and a range of hardness of the group of materials consisting of the polyurethane material, the first polyethylene material, and the second polyethylene material is 15 Shore D or less.

* * * * *

UNITED STATES PATENT AND TRADEMARK OFFICE
CERTIFICATE OF CORRECTION

PATENT NO. : 8,177,603 B2
APPLICATION NO. : 12/431515
DATED : May 15, 2012
INVENTOR(S) : Rajeev Bajaj Page 1 of 1

It is certified that error appears in the above-identified patent and that said Letters Patent is hereby corrected as shown below:

In the Specification:

Column 5
Line 5, Delete "3," and insert -- 3; --, therefor.

Column 7
Line 29, Delete "dispersability" and insert -- dispersibility --, therefor.
Line 64, Delete "nm" and insert -- $n_m$ --, therefor.

Column 9
Line 49, Delete "dia.×0.1.40"" and insert -- dia.×0.140" --, therefor.

Signed and Sealed this
Eighth Day of October, 2013

Teresa Stanek Rea
*Deputy Director of the United States Patent and Trademark Office*